United States Patent [19]

Hradcovsky et al.

[11] 3,956,080
[45] May 11, 1976

[54] COATED VALVE METAL ARTICLE FORMED BY SPARK ANODIZING

[75] Inventors: Rudolf J. Hradcovsky, Long Beach; S. Heagan Bayles, Jr., Sands Point, both of N.Y.

[73] Assignee: D & M Technologies, New York, N.Y.

[22] Filed: Aug. 22, 1974

[21] Appl. No.: 499,638

Related U.S. Application Data

[62] Division of Ser. No. 337,149, March 1, 1973, Pat. No. 3,832,293.

[52] U.S. Cl. .............................. 204/56 R; 204/56 M; 204/58; 427/344; 428/450; 106/74
[51] Int. Cl.² ................ C25D 11/04; C25D 11/30; C25D 11/26
[58] Field of Search ................ 204/56 R, 56 M, 58, 204/; 117/129, 169 A; 427/344; 428/450; 106/74

[56] References Cited

UNITED STATES PATENTS

| | | | |
|---|---|---|---|
| 2,978,361 | 4/1961 | Seidl | 117/127 |
| 3,748,172 | 7/1973 | Speirs et al. | 117/135.1 |
| 3,843,392 | 10/1974 | Sterling et al. | 117/129 |

*Primary Examiner*—R. L. Andrews
*Attorney, Agent, or Firm*—Brooks Haidt Haffner & Delahunty

[57] ABSTRACT

Metals and alloys which have the property of electrolytic rectification are coated by immersion in an aqueous bath comprising an alkali metal hydroxide, an alkali metal silicate and a catalyst and application of a sufficiently high voltage to obtain spark discharge at the surface to be coated thereby to provide a durable coating on the surface.

5 Claims, 3 Drawing Figures

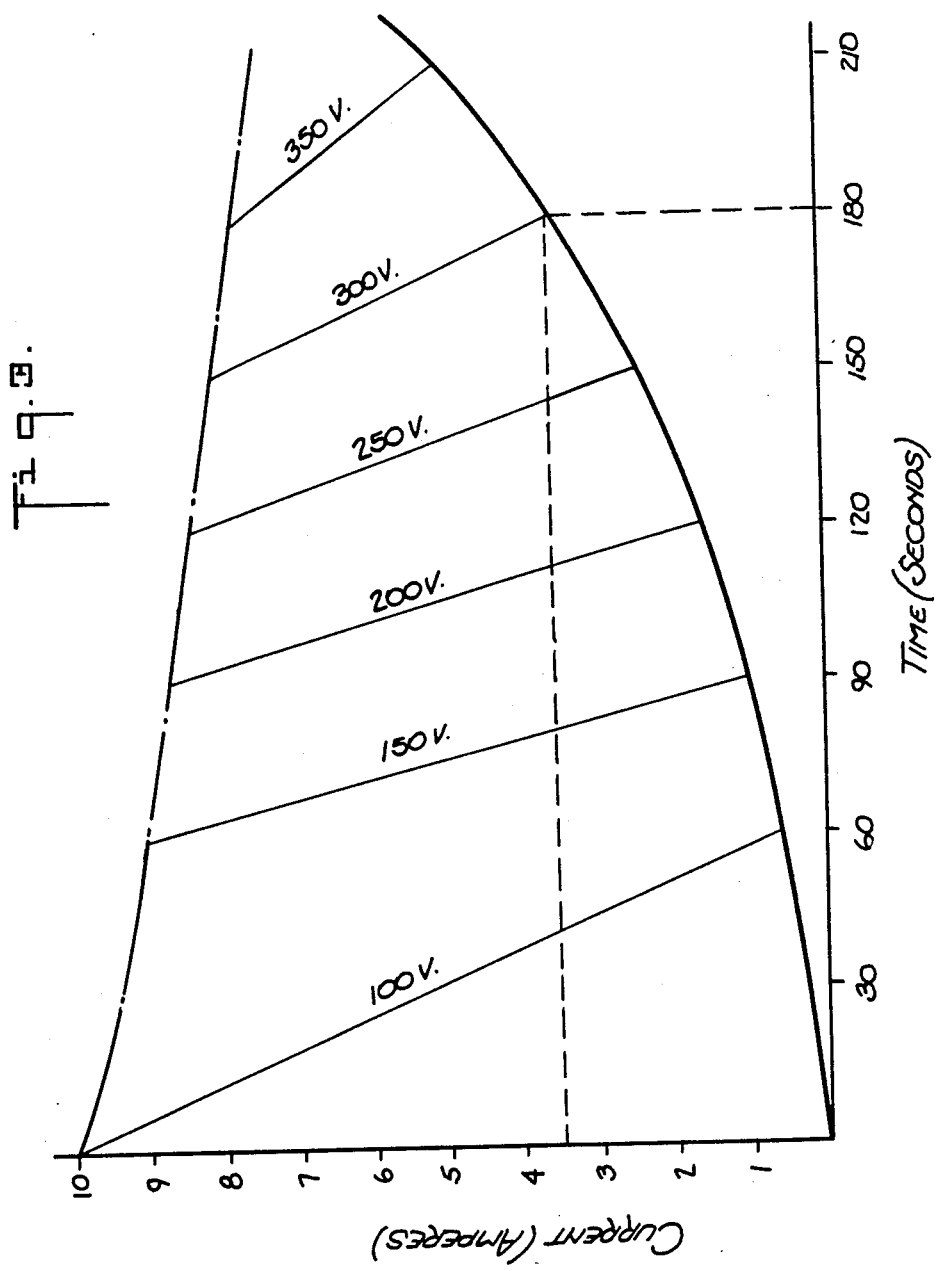

COATED VALVE METAL ARTICLE FORMED BY SPARK ANODIZING

This is a division of application Ser. No. 337,149, filed Mar. 1, 1973, now U.S. Pat. No. 3,832,293.

BACKGROUND OF THE INVENTION

1. Field of the Invention

This invention relates to an electrolytic process for forming a hard protective film on a metallic surface and to products made by the process.

2. Description of the Prior Art

Although metal surfaces which are painted or enameled can resist chemical attack, such organic coatings have other disadvantages such as degradation at high temperatures. Frequently, paints, enamels and the like do not adhere well to metallic surfaces, especially when temperature cycling is involved.

A well known electrolytic process for providing a protective coating on metals is the anodization of aluminum. Various other chemical and electrochemical processes have been used in attempts to provide a durable protective coating for metals and their alloys.

U.S. Pat. No. 1,923,539 relates to the formation of protective coatings on aluminum, magnesium and their alloys by using alternating current at about 100 volts. Various solutions are mentioned as suitable for the coating process. U.S. Pat. No. 2,380,044 concerns the coating of metal articles by electrodeposition using molybdenum compounds. The baths discussed in this patent always contain another metal, preferably nickel, in addition to molybdenum.

However, none of the prior art methods had provided a coating that is highly resistant to attack by corrosive agents such as strong acids and strong alkalis. Anodized aluminum for example, is not resistant to either acids or mild alkalis.

Other methods have been proposed for the coating of metal and alloy surfaces for special purposes. For example, U.S. Pat. No. 3,625,737 relates to the provision of a silicate coating on aluminum reflector surfaces by means of a number of treatment steps intended to avoid "hazing".

Czechoslovakian Patent No. 104,927 to Hradcovsky and Belohradsky relates to the production of a bypass element for electrical circuits by coating an aluminum substrate electrolytically with a silicate layer in a weakly alkaline aqueous bath comprising either sodium or potassium silicate and a small amount of ammonium molybdate.

U.S. Pat. No. 1,748,012 shows a dry surface rectifier cell using aluminum plates coated in a borax solution, and suggests that other metals could be similarly treated to produce rectifier plates or washers. U.S. Pat. No. 1,827,204 shows the coating of iron, zinc, cadmium, copper and silver by electrolytic treatment with a chromium-containing bath.

U.S. Pat. No. 1,925,307 to DeBoer et al. shows the formation of a layer of an oxide on zirconium, titanium, thorium and hafnium for use in electrical condensers. U.S. Pat. No. 2,019,546 shows the production of oxide cathodes with coatings of alkaline earth metal bronze. U.S. Pat. No. 2,231,373 relates to the coating of aluminum by means of electrolysis in a bath containing titanium salts.

U.S. Pat. No. 2,380,044 shows the deposit of a molybdenum compound on aluminum by electrodeposition from a bath which may contain sodium hydroxide. U.S. Pat. No. 2,417,133 also shows the deposition of molybdenum-oxygen deposits on aluminum.

U.S. Pat. No. 3,305,384 shows the production of aluminum coated iron surfaces, and U.S. Pat. No. 3,457,145 relates to the preparation of metal film resistors and shows the anodization of aluminum coated strips.

SUMMARY OF THE INVENTION

The process of the present invention relates to the provision of a coating for metallic surfaces which is resistant not only to attack by chemical agents, but also is resistant to the effects of wide variations in temperature. The coating of the invention is nonporous, hard, durable, and abrasion-resistant. Briefly, the process of this invention comprises immersing a rectifier metal in a strongly alkaline aqueous bath containing alkali metal silicate, alkali metal hydroxide, and an oxyacid catalyst of certain metals and then establishing a potential difference of at least about 220 volts at the surface of the metal to be coated so as to deposit a silicate-containing coating. The invention also contemplates metals so coated and baths for such use.

Generally, those metals that exhibit an electrolytic rectifier effect can be coated according to the invention. The term "metal" is used herein to mean elemental metals and their alloys, and those metals and alloys having the property of electrolytic rectification are denominated "rectifier metals" herein. Such rectifier metals have the property of passing electrical current when they are the negative electrode (cathode) in an electrolytic system and of presenting a high resistance and greatly limiting current flow when they are the positive electrode (anode) in such systems. This high resistance to electric current flow in the anodic condition is apparently due to formation of a high electrical resistance zone or coating at or on the surface of the metal. Since this property has been used to provide rectification of alternating current to afford direct current, metals exhibiting the effect have been referred to as rectifier metals.

This property of passing current preferentially in one direction in electrolyte baths is exhibited by aluminum, beryllium, magnesium, tantalum, tellurium, silicon, germanium, titanium, niobium, and calcium, all of which can be effectively coated in accordance with the invention.

As taught herein, alloys as well as pure or commercially pure rectifier metals can be treated. For example, a wide variety of aluminum alloys such as AA 100.1, AA 238.2, AA 295.0, AA 359.0, AA 390.2, AA 413.0, AA 535.0, AA 713.0, AA 850.1, and the like can be coated, as can any other alloy shown in "Registration Record of Aluminum Association Alloy Designations and Chemical Composition Limits for Aluminum Alloys in the Form of Castings and Ingot", published by The Aluminum Association, New York, N.Y., U.S.A. Those skilled in the art will appreciate that the rectifier metal can be in the form of castings, ingot, rolled or extruded sheet, tubing, and other forms used in producing articles. A non-rectifier metal coated with, bonded to, or otherwise covered with a suitable rectifier metal can also be treated to form a durable coating on the rectifier metal component according to the present invention and is accordingly contemplated herein.

It will be understood from the present disclosure that the rectifier metal is the anode of the electrolytic system, so that the metal itself is at a positive potential and this positive potential decreases across the surface of the metal because of the voltage or potential difference between the rectifier metal and the cathode. The cathode can be any suitable material which will not substantially dissolve in, react with, or otherwise interfere with the deposition of the surface coating on the anode.

Cathode materials used herein include iron, nickel, graphite or other conducting forms of carbon and mixtures containing conductive carbon, magnesium, chromium, silicon, mercury, sodium-mercury amalgam, platinum, gold, rhodium, silver, palladium, iridium, osmium, cobalt and the like. It will be recognized by those skilled in the art that certain types of cathodes may be enclosed in permeable glass or other poorly conductive material. Preferred cathode materials for use herein are iron and nickel. It will be appreciated from the present description that the cathode need not be in the form of an electrode element dipped in the solution but it can, in fact, comprise the container for the electrolyte bath. Similarly, if it were desired to coat a rectifier metal for use as a container, it is possible to use the rectifier metal to hold the electrolyte bath and to immerse a rod, bar, sheet, grid or other suitable form of metal as the cathode.

In accordance with the invention, a high voltage difference is utilized and the cathode is a different metal from that of the anode to be coated. The electrical potential difference and current density applied to cause deposition of a protective coating in accordance with the invention vary according to factors such as composition of the bath, the rectifier metal, type of coating desired, and the like. Generally speaking, the anode and cathode are connected to an electrical power source and the voltage across the bath is gradually increased until a spark discharge occurs at the anode surface. The voltage is further increased until a coating of the desired thickness has formed. Alternating current can be used because of the rectification effect, as can pulsating direct current, and direct current is preferred. Alternating current should not be utilized with a cathode which will add deleterious ions to the bath during current reversal. A film begins to form at the anode when a potential difference is applied, but this film at the outset apparently allows some of the anions to reach the anode surface. The thickness of the film increases with the applied voltage and time of application. Film thicknesses produced can range up to 2 mm. Generally, thicknesses of from 0.005 mm to 0.5 mm are utilized.

The occurrence of the spark discharge is believed to cause the film formed at the anode to melt at a high temperature characteristic of the material deposited. The continuous fused layer thus formed apparently accounts for the efficacy of the protective coating.

FIG. 3 illustrates potential-current relationships in another preferred embodiment of the invention.

In accordance with an embodiment of the invention, the article of rectifier metal to be coated is immersed in the electrolyte bath according to this invention, and a cathode is also immersed in the bath. A potential difference is applied with the positive pole being electrically connected to the rectifier metal and the negative pole being electrically connected to the cathode.

Figure 1:
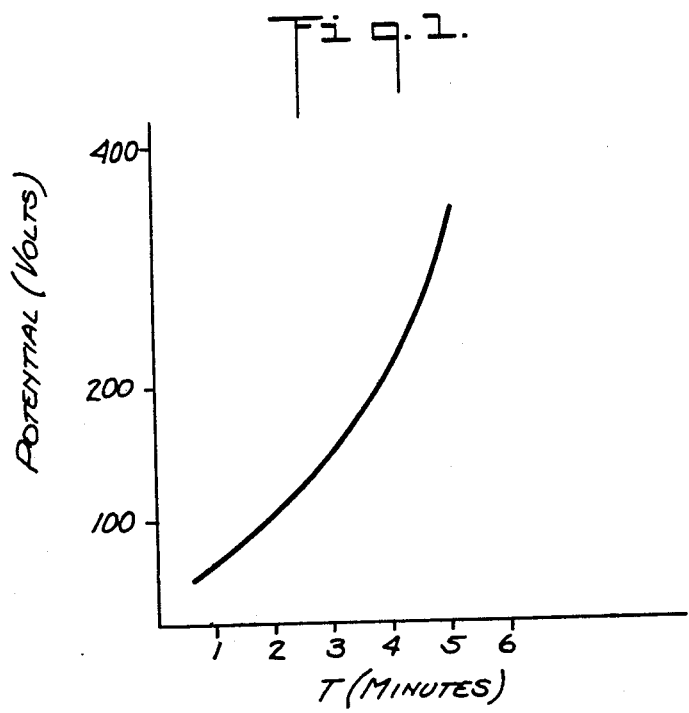
FIG. 1 shows the relationship of cathode potential to current density in a preferred embodiment of the invention.
Figure 2:
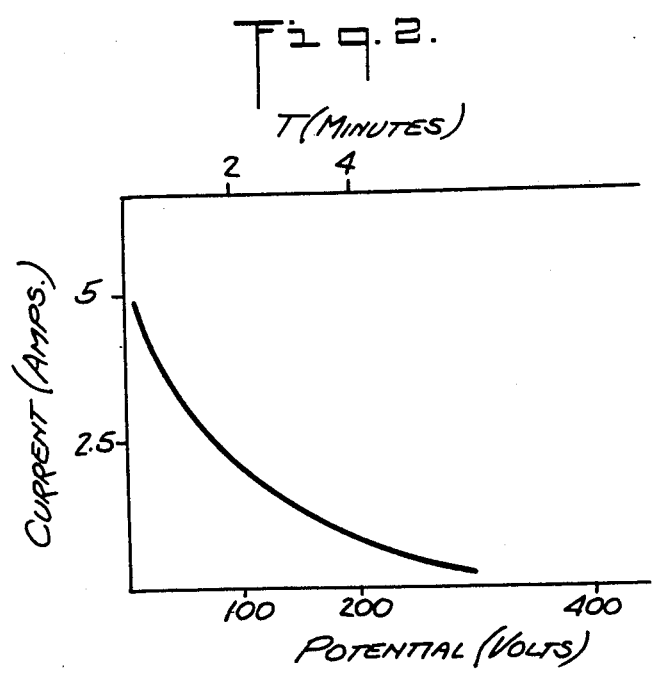
FIG. 2 illustrates the increase of cathode potential with time in the preferred embodiment illustrated in FIG. 1.

As shown in FIG. 1 of the drawing, which depicts a curve obtained with automatic voltage and current control, in which T, the abscissa, represents time in minutes, and V, the ordinate, represents potential difference in volts, the cathode potential is controlled to rise gradually at first and then more rapidly as the treatment progresses. FIG. 2, in which the ordinate represents current, I, plotted against time, $t$, and potential difference, V, shows that although some current flows at the outset, the current decreases as a protective layer is built up at the anode.

When the potential difference reaches and exceeds about 220–230 volts, spark discharges occur, fusing the material deposited on the anode and thus forming the durable protective coating of the invention. The particular data illustrated in FIGS. 1 and 2 are obtained with a specimen of rectifier metal, more specifically aluminum, having a total surface area of 50 cm$^2$. Thus, it represents the area of a square piece of rectifier metal sheet 5 cm on a side. It will be noted that the original current density is accordingly about 0.1 amp/cm$^2$ and that this decreases with the passage of time to the order of 0.005 amp/cm$^2$. On the other hand the potential is increased to about 220 volts and beyond to obtain the spark discharge at the surface of the rectifier metal.

Depending upon the electrolyte bath composition, the rectifier metal, the thickness and other properties of the coating desired, and to a lesser extent on the cathode material and dimensions, and the rectifier metal dimensions, potentials of up to 1500 V can be required to obtain the desired spark discharge and fusion of the coating.

On the other hand, the use of excessive voltages and current densities needlessly consumes electrical power, and more importantly to the aims of the present invention, heats the bath. It has been found generally desirable that the temperature of the baths ranges from 40° to 80°C, and in many preferred embodiments of the invention 60°C is the optimum preferred temperature. Accordingly, while the potentials utilized can range from about 220 V to about 1500 V, the desirable range for most uses is from 350 to 1000 V. Frequently, the maximum voltage in preferred embodiments is 500 to about 650 V. The lowest potentials, 220–250 V., are utilized to provide a very thin coating on substrates such as aluminum for use as plates in the graphic arts.

It has been found generally that a very pure rectifier metal, for instance, 99.9 percent pure aluminum, can be treated in the minimum amount of time. When a less pure rectifier metal, for instance, 90 percent pure aluminum, is treated, the time required to obtain the same coating thickness with equal applied potentials can require twice as much time. All parts, proportions, percentages and ratios herein are by weight, unless otherwise stated. At preferred voltages utilized herein, the time of treatment ranges from as little as 4 minutes to 30 minutes. In some uses or with limited current density, times of many hours can be used.

The electrolyte bath utilized in carrying out the present invention is highly alkaline by virtue of the presence of substantial amounts of at least one alkali-metal hydroxide. The desirable alkali-metals contemplated for use herein are lithium, sodium, and potassium. Especially preferred in certain embodiments of the invention are sodium hydroxide and potassium hydroxide. It has been found that when lithium silicate is utilized as the silicate component, the preferred alkaline component is sodium hydroxide. Sodium hydroxide is preferred for superior hardness in some embodiments.

It will be appreciated by those skilled in the art that the pH of the bath will be very high. In fact, with the quantities of hydroxide used herein, the pH is at, or so close to, 14 that pH measurements in the usual sense may provide little information. The alkalinity of the baths utilized herein will accordingly be determined by the concentration of the particular hydroxide or combination of hydroxides used. It is desirable that the highly alkaline baths of the present invention contain at least about 5 g/liter of alkali-metal hydroxide.

It has been found that the aforesaid minimum concentration of hydroxide is required in order to provide a durable coating on the rectifier metal. Generally, the hardness of the coating increases with increasing amounts of hydroxide in the bath. Thus, amounts of hydroxide up to the saturation level can be used, although in certain aspects of the invention concentrations of 100 g/liter are sufficient to provide the results. Preferred hydroxide concentrations for use herein are from about 10 to about 40 g/liter.

The alkaline electrolyte bath utilized in the present process also contains an alkali metal silicate, and it is believed that the action of the silicate is largely responsible for the excellent, durable protective coating obtained on the rectifier metals. The silicates contemplated for use herein are the silicates of lithium, sodium or potassium. It will be appreciated by those skilled in the art that mixtures of two or more such silicates can be used. Especially preferred for use herein are sodium silicate, $Na_2SiO_3$, and potassium silicate, $K_2SiO_3$.

The quantity of silicate is sufficient to obtain a durable coating on the metal, and amounts up to the solubility limit of the silicate can be used. In general, it is desirable that the bath contain from about 2.5 g/liter to about 200 g/liter of silicate, and it is preferred in certain embodiments to maintain the silicate level from about 10 g/liter to 50 g/liter because in many instances the hardness of the coating decreases with increasing silicate concentration in the bath. Certain preferred embodiments of the invention utilize about 15 to about 25 g/liter of alkali-metal silicate.

A catalyst is also present in the highly alkaline electrolyte bath. The function of this additional material is to provide a hard, durable, highly adherent coating on the metal. While the function of the so-called catalyst has not been entirely elucidated, it appears to inhibit oxygen absorption from the ambient atmosphere and to inhibit or remove carbonate ions from the solution. The coating obtained with catalyst is significantly harder and more durable. The electrolyte bath also seems more stable in use.

In any event, the catalysts suitable for use herein can generally be characterized as oxyacids of certain elements, specifically, tellurium and selenium, or a combination thereof. These oxyacids are furnished to the bath in the form of alkali metal salts thereof, the preferred alkali metals being set forth above in connection with the hydroxide and silicate. The catalyst is present in relatively small amounts, generally within the range of from 0.01 to about 10 g/liter. Insufficient catalyst will not provide the excellent results obtained according to the present process, while the use of excessive catalyst is expensive, unnecessary, and can cause undesirable color changes and other deficiencies in the finished coating. Sodium tellurate, $Na_2TeO_3$ has been found to be particularly suitable as a catalyst, desirably in concentrations between 0.01 g and 10 g per liter of water, and most preferably about 1 g of $Na_2TeO_3$ per liter of water.

Variations in color and other properties of the coating can also be obtained by adding quantities of other compounds providing anions containing vanadium, arsenic, boron, chromium, titanium, tin, antimony, tungsten, molybdenum or a combination thereof in the form of alkali metal salts. These materials are used in amounts up to about 50 g/liter.

The presence of certain ions in the bath should be avoided, since they have a deleterious effect on the formation of the durable coating. The undesirable ions include bromide, fluoride, iodide, chloride, sulphate, nitrate and cyanide ions. Further, when it is desired to obtain the greatest hardness for the non-porous silicate coating, the bath, and accordingly the silicate, hydroxide, catalyst, and water used to prepare the bath should be free of soluble compounds of elements from Groups IVb, Vb, VIb, VIIb, VIII, Ib and IIb of the Periodic Table, namely titanium, zirconium, hafnium, niobium, tantalum, chromium, molybdenum, tungsten, manganese, rhenium, iron, nickel, cobalt, ruthenium, rhodium, palladium, osmium, iridium, platinum, copper, silver, gold, zinc, cadmium, and mercury.

After the voltage is increased to provide the spark discharge and the coating has been formed as illustrated herein, the power is removed from the anode and cathode and the rectifier metal workpiece anode is removed from the bath. It can be rinsed to remove the highly alkaline electrolyte bath from the surface. Especially when the durable coating is required to have a good appearance in addition to its durability, rinsing in plain water is desirable to avoid spotting of the coated surface.

The surface coatings so produced have a homogeneous appearance which could be described as glassy or vitreous. This fused coating can be so firmly bonded to or incorporated into the surface of the rectifier metal that the metal can be bent double without failure of the coating.

The coating is so hard in many embodiments of the invention that a coated aluminum article will scratch glass. The coating is also well adapted to receive a further surface coating when this is considered desirable for special appearance effects. Thus, it can be used to provide a foundation for a lacquer coating which is subsequently baked at a conventional high temperature.

The silicate coated rectifier metals prepared according to the present invention are characterized by virtual lack of porosity and are thus readily distinguished from the products of Czechoslovakian Patent No. 104,927, supra. Depending upon their final utility the coating can be made extremely hard or it can be softer so that it will flex more freely when the underlying metal substrate is bent over a short radius. The color, surface appearance, and coating thickness can also be varied by controlling current density, voltage, bath composition, time of treatment, and the other factors detailed herein. Utilities of articles coated according to the present process can range from extremely thin base coating on plates to be used in the graphic arts to very thick coatings for use under abrasive conditions. Preparation of aluminum plates for the graphic arts according to the present invention is most advantageous because the coating, thin though it is, levels irregularities in the aluminum and obviates the machining usually required, while it simultaneously deposits the requisite silicate coating. Such printing plates are generally made from 5 to 20 mil aluminum sheet.

As another example of applications of the articles produced, aluminum strips can be coated to provide insulation so that transformer windings can be made from the strips. Such strips can further be coated with a thin epoxy film, and the silicate coating provides an excellent base for the epoxy. It is characteristic of the non-porous coated articles of the present invention that they do not pass substantial electric current in aqueous baths at potentials less than about 200 V.

The following examples are given to illustrate embodiments of the invention as it is presently preferred to practice it. It will be understood that these examples are illustrative, and the invention is not to be considered as restricted thereto except as indicated in the appended claims:

EXAMPLE I

The process of the invention is illustrated by the use of an aluminum anode to provide a non-porous coated plate. The anode, a plate of AA 201.0 aluminum, having a surface area of 50cm$^2$, and a thickness of one millimeter, is immersed in a bath having the following composition:

| | |
|---|---|
| Sodium silicate (52° Be) | 35 g |
| Sodium hydroxide (granular) | 25 g |
| Sodium tellurate catalyst | 1 g |
| Water | 1000 g |

Using an iron rod as the cathode and a direct current source, an initial potential of 50 V produces a current of 500 ma. A film is seen to form at the anode surface as soon as the starting potential difference is applied, but this film is not the protective coating contemplated by the invention.

The current flow rapidly drops as the film at the anode thickens, and after one minute the current is 10 ma. Further increasing the voltage to 200 V produces a current of 50 ma. Five minutes after the initial application of D.C. voltage the potential difference is increased to 300 V and a spark discharge is observed at the anode surface. Because of the presence of sodium, the sparks are yellow in color. The electric discharge produced at the anode surface as the voltage is further increased to about 350 V is hot enough to melt the material of the film at the anode surface, and a smooth layer of pore-free silicate-containing material is formed on the anode. The process can be stopped at this point and the anode removed. After 6 minutes of treatment with applied potential at 400 V the thickness of the protective layer is about 0.2 mm.

If the coating process is continued, by raising the potential difference to 600 V, the protective layer deposited reaches a thickness of up to 2 mm. Longer treatment, reaching still higher voltages, such as, say, 1000 V, produces a thicker coating. A coating 1 mm thick is produced by treatment for 30 minutes with a final potential of about 450 V, the current flow at the end of treatment being 50 ma.

A bath having the composition of Example I produces a milk-white coating which is too hard to be scratched by glass. Thin coatings produced with the bath composition and voltages applied as described in this Example are smooth to the touch. Coatings thicker than 0.05 mm, are rougher than thin coatings, but are not porous. A rough coating can be produced having a thickness up to 2 mm.

Baths having other constituents and concentrations within the scope of the present invention can be utilized in generally the same manner to provide protective or other useful coatings having a variety of characteristics, as will be clear from the present description. Essentially, the electrolytic baths used for coating rectifier metals comprise aqueous mixtures of an alkali metal silicate, alkali metal hydroxide, and an oxyacid catalyst of tellurium, selenium, or a mixture of such oxyacids. The oxyacid catalyst is added in the form of an alkali metal salt thereof.

As taught above, the quantity of catalyst desirably ranges from 0.01 to about 10 g/liter of water in the electrolyte, as constituted for use. It will be appreciated by those skilled in the art from the present disclosure that the aqueous electrolyte bath can be prepared in concentrated form for shipment so as to maximize the quantity of solid ingredients and minimize the volume and weight of fluid. In such instances, the concentration of silicate, hydroxide, and catalyst in the electrolyte can be higher than that taught above, and the actual concentrations are limited by the solubility of the several components under the temperature conditions to be encountered. in shipment. It is of course possible to ship saturated two-phase or multiple-phase solutions containing solids, but it is generally desirable to provide the electrolyte in a form which need only be diluted with water to provide the desired baths.

A concentrated electrolyte solution can accordingly contain up to about 1000 g/liter of alkali metal silicate, about 500 g/liter of hydroxide, and about 50 g/liter of catalyst. Such concentrated solutions are diluted after shipment to provide the desired final concentration of the components and hence the precise composition of a concentrated electrolyte bath is determined by the dilution ratio and the final relative proportion of silicate, hydroxide, and catalyst. Such relative proportions are of course those desired in the final electrolyte bath to be used.

The concentrated electrolyte baths are generally diluted with water in the ratio of from about 1 part of concentrate to 4 parts of water to about 1 part of concentrate to 20 parts of water. The electrolyte concentrates for use in the present invention accordingly preferably comprise from about 100 g/liter to 1000 g/liter of silicate, 50 g/liter to 500 g/liter of hydroxide, and 5 to 50 g/liter of catalyst.

EXAMPLE II

A rectangular panel of aluminum alloy AA 242.0, having a surface area of 100 cm$^2$ and a thickness of 3 cm, is immersed in a bath consisting of:

| | |
|---|---|
| Sodium silicate (52° Be) | 100 g |
| Sodium hydroxide (granular) | 10 g |
| Sodium tellurate catalyst | 1 g |
| Water | 1000 g |

The voltage is gradually increased to maintain a flow of current. Spark discharge occurs after 3 minutes at a potential of 230 V. After further increasing the potential to 350 V the process is terminated and the panel removed. A grey-white coating about 0.01 mm thick is formed on the panel. Testing the hardness of the coating by scratching the coating with glass reveals that the grey-white coating is softer than the protective coating produced according to Example I. Tests performed with greater amounts of Na₂SiO₃ show that the hardness decreases with the increase of Na₂SiO₃ above an optimum level of 35 g of 52° Be Na₂SiO₃ per liter of water with the other constituents as in Example I.

Repetition of the process as described in Example II, but using 50 g of 52° Be aqueous Na₂SiO₃, results in a coating that is white in color and softer than the coating of Example I, but harder than the coating of Example II.

EXAMPLE III

A further embodiment of the present invention is illustrated with reference to FIG. 3 which shows the relationship between current, voltage, and time when a manually-regulated D.C. power supply is used to provide electric current. An aluminum plate of AA 201.0 aluminum 20 cm on a side and having a thickness of about 1 mm is immersed in a bath having the composition shown in Example I. The area of the aluminum panel is accordingly about 400 cm².

The power supply is set to provide 100 volts, and the initial current is approximately 10 amps. Over 60 seconds, the current drops to about 400 ma, whereupon the potential is increased to 150 volts. This increase in voltage results in a current of from 9 amps which during the next 30 seconds drops to about one ampere. After this total of 90 seconds, the potential is increased to 200 volts, and the current rises to about 8.6 amps. During an additional 30 seconds, the current drops to about 1.7 amps, whereupon the potential is increased to 250 volts. A spark discharge commences as the potential is increased from 200 volts to 250 volts.

After the current at 250 volts decreases to about 2.4 amps during the next 30 seconds, the potential is raised to 300 volts and the current rises to about 8.0 amps. After 30 seconds at 300 volts (a total elapsed time of 180 seconds) the current falls to about 3.5 amps.

The potential is next stepped up to 350 volts, producing a current of about 8 amps which decays during the next 30 seconds to about 3.6 amps. At this point, a good, non-porous silicate coating has been formed on the aluminum, and the panel can be removed, rinsed, and dried to provide a finished coated article according to the present invention. After current begins to flow through the bath, the bath temperature rises to about 60°C and is maintained at this temperature.

The lower envelope in FIG. 3 represents the minimum current values obtained as a function of potential, and the upper envelope indicates the maximum currents obtained when a higher voltage is applied. For many uses, it is sufficient to terminate the coating process at 300 volts and about 3.5 amps, as shown by the dotted lines on the abscissa and ordinate respectively.

EXAMPLE IV

A titanium plate is placed in the bath of Example I and coated with silicate utilizing the procedure of Example I. The plate is thereafter annealed at 1300°C and the silicate coating remains firmly bonded to the surface. There is no evidence of oxidation on the titanium.

EXAMPLE V

It has been found that the presence of both Na₂TeO₃ as a catalyst and an additional anion will also produce a durable protective coating. This is illustrated by using a bath having the following composition:

| | |
|---|---|
| Sodium silicate (52° Be) | 35 g |
| Sodium hydroxide (granular) | 25 g |
| Sodium vanadate | 50 g |
| Na₂TeO₃ catalyst | 1 g |
| Water | 1000 g |

An aluminum plate having a surface area of 50 cm² and a thickness of one millimeter is immersed in the bath as an anode. Steadily increasing the voltage for a period of eight minutes to reach a final voltage of 350 V produces a coating which is matte black in color and has a thickness of 0.05 mm. The black vanadium-containing coating layer is too hard to be readily scratched by ordinary window glass.

In all of the above examples, potassium hydroxide can be substituted for sodium hydroxide in equivalent amounts to provide coatings similar to those described.

EXAMPLE VI

The process according to the invention is also suited to the production of hard and durable surface coatings on articles which are exposed to extremes of temperature in the presence of corrosive agents. Such a coating is particularly desirable for use on turbine blades exposed to hot gases in jet engines. A niobium plate turbine blade having a surface area of about 30 cm² is immersed as the anode in a bath having the following composition:

| | |
|---|---|
| Potassium silicate solution (45%) | 40 g |
| Sodium hydroxide (granular) | 35 g |
| Sodium tellurate catalyst | 1 g |
| Water | 1000 g |

The voltage is steadily increased in accordance with the invention for a period of 6 minutes, at which time a voltage of 350 V is required to maintain a current flow of 300 ma. The blade is disconnected and withdrawn from the bath. A hard, thin coating is obtained.

The following test results are illustrative of the characteristics of surfaces produced according to the invention and illustrate the durability of coatings of the invention. In order to determine the suitability of coatings produced by the same procedure as set forth in Example II for use as insulated aluminum strip power transformer windings, aluminum strips 2 mm by 200 mm are subjected to breakdown voltage tests. A sample strip cycled several times to 450°F has the following breakdown voltage characteristics: after the first cycle, breakdown voltage is 1500 V; after the second cycle, breakdown voltage is 2000 V; after the third cycle, breakdown voltage is 2000 V. The strip is then held at 400°F for 60 hours and the subsequent breakdown voltage is 1500 V. The demonstrated suitability of such coatings for transformer insulation indicates another valuable use of the coatings of the invention.

Panels produced in accordance with the invention have also been subjected to salt spray testing and the protective coatings of the invention have been found to be highly resistant to such marine environments.

In addition to the aluminum alloys of the foregoing Examples, other rectifier metals can be suitably provided with protective coatings in accordance with the invention.

EXAMPLE VII

A panel of "electron" magnesium alloy (a material containing 90 percent magnesium, 5 percent aluminum, and lesser quantities of other metals) having a surface area of 50 cm², is immersed as the anode in a bath having the composition as set forth in Example I. Steadily increasing the voltage for a period of three minutes until a potential of 350 V provides a current flow of 50 ma and produces a coating 0.01 mm in thickness. The coating is white in color and too hard to be readily scratched by glass.

EXAMPLE VIII

A panel of tantalum, having a surface area of 100 cm², is immersed as the anode in a bath having the composition set forth in Example I. Steadily increasing the voltage for a period of 3 minutes, provides a coating 0.05 mm thick at a potential difference of 350 volts The coating is white in color and too hard to be readily scratched by glass.

EXAMPLE IX

Using a bath having the composition specified in Example II, a panel of titanium having a surface area of 50 cm² is immersed as the anode. The voltage is steadily increased for 3 minutes until a potential of 350 volts maintains a current flow of 50 ma wit spark discharges at the panel surface. A hard coating 0.01 mm thick and yellow-white in color is produced.

EXAMPLE X

A niobium panel having a surface area of 100 cm² is immersed as the anode in a bath having the composition specified in Example II. By gradually increasing the potential difference for a period of 3 minutes until a potential of 350 V is required to maintain a current flow of 70 ma, a hard yellow-white coating is produced. The coating is 0.01 mm thick and too hard to be scratched by glass.

What is claimed is:

1. An article comprising a rectifier metal having a non-porous, fused silicate coating on at least one surface of the metal, the coating being produced by immersing the rectifier metal in a strongly alkaline aqueous bath comprising at least one alkali metal silicate, an alkali metal hydroxide, and as a catalyst, an oxyacid of tellurium or selenium or a mixture of such oxyacids and establishing a potential difference of at least about 220 volts between the metal and the bath to deposit a silicate-containing coating on the immersed surface of the metal.

2. An article according to claim 1 wherein the thickness of the coating is from about 0.005 mm to about 2 mm.

3. An article according to claim 1 wherein the rectifier metal is aluminum, beryllium, magnesium, tantalum, tellurium, silicon, germanium, titanium, niobium, or calcium.

4. An article according to claim 1 wherein the rectifier metal is aluminum.

5. An article according to claim 4 which is suitable as a base for a printing plate wherein the coating is from about 0.05 mm to about 0.02 mm thick.

* * * * *